US006988832B2

(12) United States Patent
DeWachter et al.

(10) Patent No.: US 6,988,832 B2
(45) Date of Patent: *Jan. 24, 2006

(54) BEARING INSERT WITH CONTROLLED ENDPLAY

(75) Inventors: Ryan N. DeWachter, Simpsonville, SC (US); Donald L. Nisley, Greenville, SC (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 5 days.

This patent is subject to a terminal disclaimer.

(21) Appl. No.: 10/260,916

(22) Filed: Sep. 30, 2002

(65) Prior Publication Data

US 2004/0062463 A1  Apr. 1, 2004

(51) Int. Cl.
*F16C 19/28* (2006.01)
*F16C 43/04* (2006.01)

(52) U.S. Cl. ..................................... 384/551; 384/585
(58) Field of Classification Search ................ 384/571, 384/551, 557, 558, 559, 538, 540, 563, 569, 384/570, 583, 584, 585
See application file for complete search history.

(56) References Cited

U.S. PATENT DOCUMENTS

| 1,909,525 | A | * | 5/1933 | Curtis | 384/474 |
| 2,065,311 | A | * | 12/1936 | Hoke | 384/571 |
| 2,178,843 | A | * | 11/1939 | Slusser | 384/571 |
| 3,850,485 | A | * | 11/1974 | Zimmer et al. | 384/558 |
| 3,934,957 | A | * | 1/1976 | Derner | 384/563 |
| 3,957,319 | A | * | 5/1976 | Gorski | 384/556 |
| 4,732,497 | A | * | 3/1988 | Sawa et al. | 384/585 |
| 5,706,580 | A | * | 1/1998 | Ohtsuki et al. | 384/517 |
| 5,860,750 | A | * | 1/1999 | Kuchta et al. | 384/540 |
| 2003/0037438 | A1 | * | 2/2003 | Nisley et al. | 29/898.07 |

* cited by examiner

*Primary Examiner*—Thomas R. Hannon
(74) *Attorney, Agent, or Firm*—Patrick S. Yoder; Alexander M. Gerasimow

(57) ABSTRACT

A system and method is provided to accommodate positional variations in a bearing assembly, which has a clearance adjustment assembly for setting the roller clearance therein. The bearing assembly has multiple rows of tapered rollers disposed circumferentially between an inner sleeve and the clearance adjustment assembly, which is secured by an outer retaining sleeve. The clearance adjustment assembly has at least one clearance adjustment ring disposed adjacent multiple tapered support rings, which extend circumferentially about the multiple rows of tapered rollers. In the bearing assembly, the at least one clearance adjustment ring forces the multiple tapered support rings against the multiple rows of tapered rollers to set the desired roller clearance. Accordingly, the bearing assembly can accommodate expansion, contraction, and angular variations in the system.

39 Claims, 6 Drawing Sheets

BEARING INSERT WITH CONTROLLED ENDPLAY

BACKGROUND OF THE INVENTION

The present invention relates generally to the field of rotating machinery, and more particularly, to arrangements for securing a shaft or similar rotating member in a hollow support member, such as a bearing assembly.

A wide range of rotating machinery is known and currently in use in industrial and other applications. In many such applications shafts or hubs are supported for rotation within hollow members, such as bearings and other mechanical supports. The shaft or hub may be driven in rotation by a prime mover, such as an electric motor or engine, or may be linked to various power transmission elements such as chain drives, belt drives, transmissions, pulleys, and so forth. In all such applications, mounting structures are typically required to support the rotating and non-rotating members with respect to one another in a manner sufficient to resist loading, while still allowing for free rotation of the rotating members.

When mounting rotating elements on or within bearings, several key considerations generally come into play. For example, the bearing and associated coupling or mounting structures must be capable of withstanding the anticipated loads of the application. Moreover, the mounting structures should allow for the desired balancing or centering of loads within or about the bearing assemblies. Also, the mounting arrangements should prevent premature wear or fretting of the shaft or other mounting components, and thus provide for a maximum life in normal use. Finally, the mounting structures would ideally be relatively straightforward in application, permitting the shaft or hub and bearing assemblies to be installed without undue expense, both in terms of time and parts. The latter concern extends to dismounting or disassembling the various components for servicing and replacement when necessary.

Although mounting structures have been developed that address these concerns, further improvement is necessary. For example, various tapered locking structures have been developed that force tapered members between a shaft and a mounting hub or bearing. A wide range of structures have been developed to force a tapered sleeve, for example, into engagement between a hollow member and a shaft. Such structures provide good mechanical support and allow for tight engagement of the hollow member and shaft. In certain known arrangements, the foregoing structures are incapable of accommodating system expansion or misalignment, thereby increasing the wear and eventually damaging a bearing assembly, a tapered sleeve, and other associated components of the system. Existing mounting components also can be expensive to manufacture and difficult to assembly and disassemble.

There is a need, therefore, for an improved system for mounting a shaft or similar mechanical component within a hollow member. There is a particular need for a straightforward and reliable system for supporting tapered rollers in a bearing assembly with a desired bearing clearance. A need also exists for a bearing assembly capable of accommodating system expansion and misalignment.

SUMMARY OF THE INVENTION

A system and method is provided to accommodate positional variations in a bearing assembly, which has a clearance adjustment assembly for setting the roller clearance therein. The bearing assembly has multiple rows of tapered rollers disposed circumferentially between an inner sleeve and the clearance adjustment assembly, which is secured by an outer retaining sleeve. The clearance adjustment assembly has at least one clearance adjustment ring disposed adjacent multiple tapered support rings, which extend circumferentially about the multiple rows of tapered rollers. In the bearing assembly, the at least one clearance adjustment ring forces the multiple tapered support rings against the multiple rows of tapered rollers to set the desired roller clearance. The bearing assembly also may have seals disposed between the inner sleeve and the outer retaining sleeve at opposite sides of the multiple rows of tapered rollers. In operation, the inner sleeve is mountable to a rotatable member, while the outer retaining sleeve is insertable into a desired bearing mount. For example, the inner sleeve may have a screw mount assembly or an adapter mount assembly, such as a compressive fit mechanism. The outer retaining sleeve may be secured within the desired bearing mount via retaining structures disposed about the outer retaining sleeve at a desired spacing, such as a spacing providing a desired range of longitudinal movement. The desired bearing mount also may have a spherical outer structure, which is pivotally mountable in a spherical mount chamber. Accordingly, the bearing assembly can accommodate expansion, contraction, and angular variations in the system.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Figure 1:
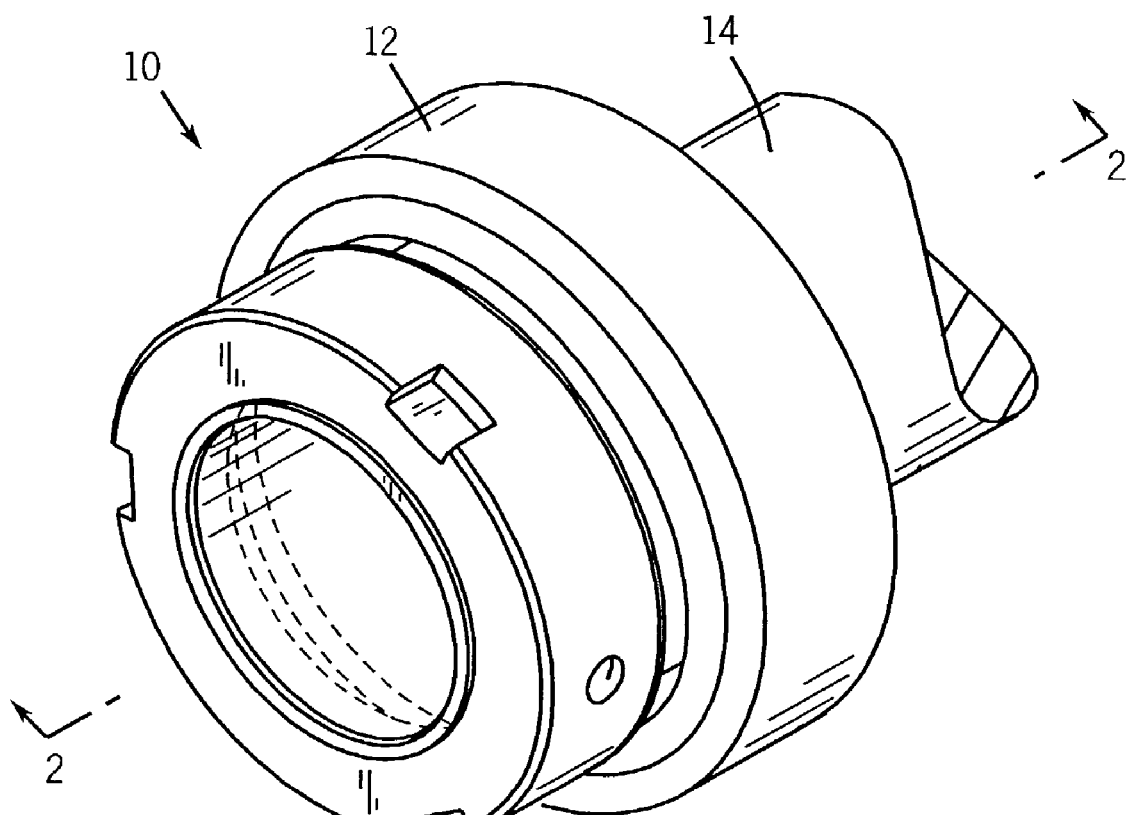
FIG. 1 is a perspective view of an exemplary bearing system of the present technique, illustrated as a bearing assembly disposed about a shaft.

Turning now to the drawings, and referring first to FIG. 1, a bearing system 10 is illustrated generally for securing a mechanical member within a hollow member. In the application illustrated in FIG. 1, the hollow member is part of a bearing assembly 12 secured on a shaft 14. As will be appreciated by those skilled in the art, many such applications exist, typically for rotating machinery and power transmission applications. As noted above, it should be borne in mind that the system described herein may be applied in various settings, including for rotating and nonrotating applications. Moreover, while a shaft is shown and described herein, various types of mechanical elements may be employed with the present system, such as hubs, various support extensions, gearing, pinions, and so forth. Similarly, while as described herein bearing assembly 12 supports shaft 14 in rotation, in other applications, the central member, such as shaft 14 may be stationary with the bearing supporting other elements in rotation, such as in pulleys, conveyers and the like. The bearing assembly 12 also may comprise a variety of internal and external mount mechanisms, such as threaded fasteners, compressive fit mechanisms, pivotal or spherical joint mechanisms, and so forth.

Figure 2:
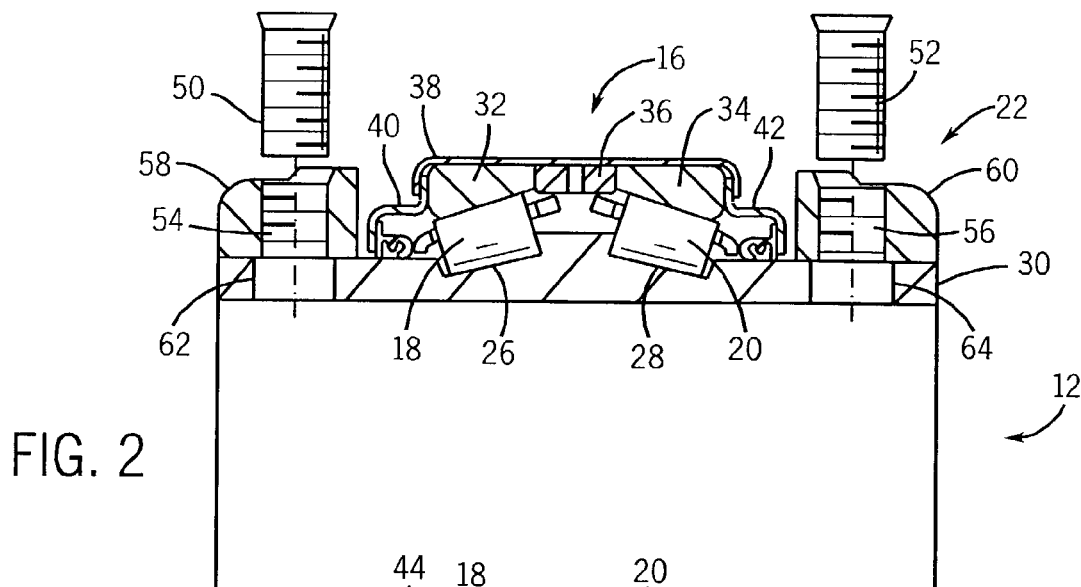
FIG. 2 is a partial sectional view of the bearing system of FIG. 1, illustrating an exemplary embodiment of the bearing assembly having a screw mount assembly.

As described in further detail below with reference to FIGS. 2–3 and 7–10, the bearing assembly 12 of the present technique also has an integral clearance control and support mechanism 16. The mechanism 16 functions to set the clearance of tapered roller arrays 18 and 20, which are disposed within the bearing assembly 12. The tapered roller arrays 18 and 20 also may be factory sealed and lubricated within the integral clearance control and support mechanism 16 to facilitate simple and flexible mounting of the bearing assembly 12. In the embodiment of FIG. 2, the bearing assembly 12 has a threaded fastener mechanism 22 to mount the bearing assembly 12 to the shaft 14. In the embodiments of FIGS. 3–10, the bearing assembly 12 has an adapter or compressive fit mechanism 24 to mount the bearing assembly 12 to the shaft 14. For external mounting, the bearing assembly 12 may have a cylindrical or spherical casing that is movingly insertable in a mount structure to accommodate system expansion and misalignment, such as illustrated in FIGS. 7–10.

As illustrated in FIG. 2, the bearing assembly 12 has the integral clearance control and support mechanism 16 disposed circumferentially about tapered roller arrays 18 and 20, which are disposed in angled recesses 26 and 28 of inner sleeve 30. The integral clearance control and support mechanism 16 may include tapered supports 32 and 34, an intermediate clearance adjustment ring 36, and an outer retaining sleeve 38. The tapered supports 32 and 34 extend circumferentially around the respective tapered roller arrays 18 and 20 to hold the tapered roller arrays 18 and 20 in the respective angled recesses 26 and 28. Given the angled relationship between the tapered supports 32 and 34 and the respective tapered roller arrays 18 and 20, the wedged position of the tapered supports 32 and 34 controls the clearance or endplay of the tapered roller arrays 18 and 20 between the tapered supports 32 and 34 and the respective angled recesses 26 and 28. Accordingly, the clearance adjustment ring 36 has dimensions, e.g., a width, selected to set the tapered supports 32 and 34 in a desired clearance position relative to the respective tapered roller arrays 18 and 20. The outer retaining sleeve 38 is then secured about the tapered supports 32 and 34 and the intermediate clearance adjustment ring 36 to set the desired clearance. It should be noted that the integral clearance control and support mechanism 16 can use any suitable wedging mechanism to set the desired clearance of the tapered roller members 18 and 20. Moreover, the roller members 18 and 20 may comprise any number or type of rotatable members, such as spherical members, cylindrical members, tapered cylindrical members, egg-shaped members, and so forth.

The bearing assembly 12 also may have seals 40 and 42 extending between the inner sleeve 30 and the outer retaining sleeve 38, as illustrated in FIG. 2. The seals 40 and 42 may be integral with the inner sleeve 30, integral with the outer sleeve 38, integral with one another, or separately insertable to form a sealed enclosure 44 around the tapered roller arrays 18 and 20. The bearing assembly 12 also may be lubricated through lubrication receptacles 46 and 48, which extend through the outer retaining sleeve 38 and the clearance adjustment ring 36 and into the sealed enclosure 44. Accordingly, the tapered roller members 18 and 20 may be factory set with a desired rolling clearance, factory sealed and lubricated, and then distributed as an integral bearing assembly 12. Moreover, as mentioned above, the bearing assembly 12 is externally mountable in a movable manner, such that the bearing assembly 12 can accommodate system expansion and misalignment.

The bearing assembly 12 also may have a variety of mounting mechanisms. As illustrated in FIG. 2, the threaded fastener mechanism 22 can be used to mount the bearing assembly 12 to the shaft 14. The illustrated threaded fastener mechanism 22 includes threaded fasteners 50 and 52, which are insertable into threaded receptacles 54 and 56 of collars 58 and 60, respectively. The collars 58 and 60 are positionable about opposite ends of the inner sleeve 30, such that the threaded fasteners 50 and 52 may be rotated radially inwardly through the inner sleeve 30 via receptacles 62 and 64. In operation, the threaded fasteners 50 and 52 exert a retaining force against the shaft 14 to secure the bearing assembly 12 to the shaft 14.

Figure 3:
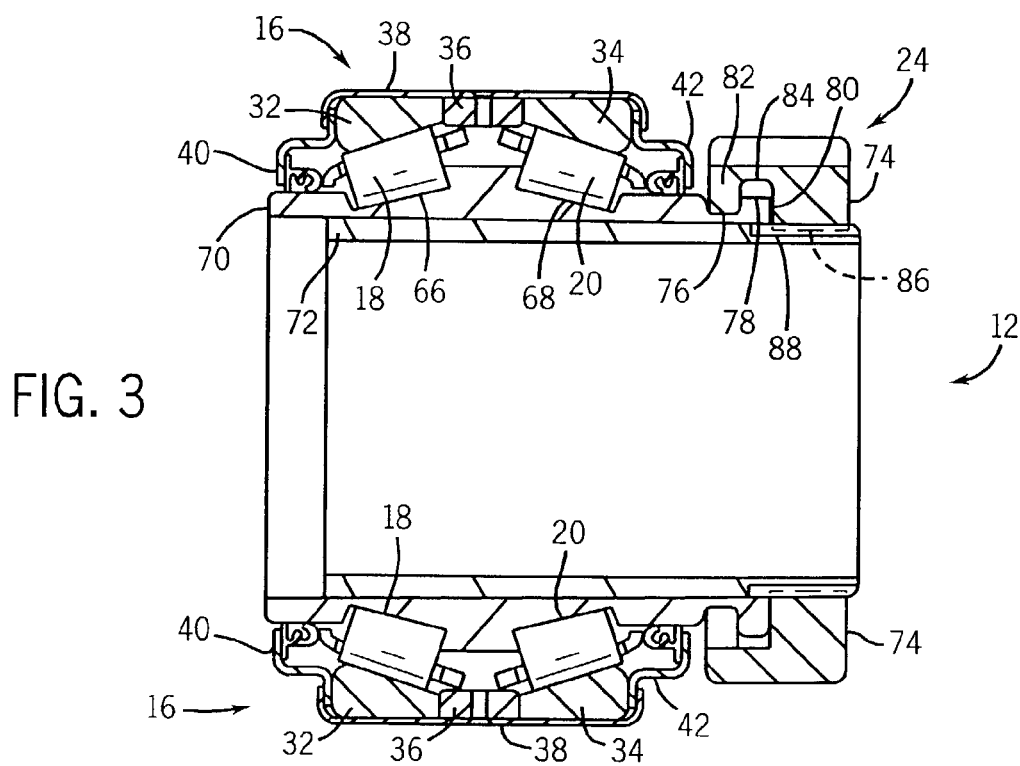
FIG. 3 is a partial sectional view of the bearing system of FIG. 1, illustrating an alternative embodiment of the bearing assembly having an adapter mount assembly.

Alternatively, the bearing assembly 12 can be mounted to the shaft 14 via the compressive fit mechanism 24, as illustrated in FIG. 3. The bearing assembly 12 of FIG. 3 has the integral clearance control and support mechanism 16 disposed circumferentially about the tapered roller arrays 18 and 20. As illustrated, the tapered roller arrays 18 and 20 are disposed movably between the tapered supports 32 and 34 and bearing races 66 and 68 of the compressive fit mechanism 24. The clearance adjustment ring 36 then sets the rolling clearance or endplay of the tapered roller arrays 18 and 20. The clearance adjustment ring 36 has dimensions, e.g., a width, selected to set the tapered supports 32 and 34 in a desired clearance position relative to the respective tapered roller arrays 18 and 20. The outer retaining sleeve 38 is then secured about the tapered supports 32 and 34 and the intermediate clearance adjustment ring 36 to set the desired clearance. The illustrated bearing assembly 12 also may have seals 40 and 42 and lubrication receptacles 46 and 48 to facilitate a sealed lubrication of the tapered roller arrays 18 and 20 inside the sealed enclosure 44. Accordingly, the tapered roller members 18 and 20 may be factory set with a desired rolling clearance, factory sealed and lubricated, and then distributed as an integral bearing assembly 12.

The compressive fit mechanism 24 illustrated in FIG. 3 may comprise a variety of radially compressive mechanisms, such as a pair of concentric sleeves 70 and 72 wedgingly intercoupled via a threaded fastener 74. As illustrated, the bearing races 66 and 68 of sleeve 70 support the tapered roller arrays 18 and 20, while the sleeve 72 is mountable about the shaft 14. In order to create a compressive force, at least one of the concentric sleeves 70 and 72 has a tapered geometry, which creates a wedging relationship between the concentric sleeves 70 and 72. Moreover, at least one of the concentric sleeves 70 and 72 is threadingly coupled to the threaded fastener 74, while the remaining sleeve is longitudinally movable with the threaded fastener 74. Accordingly, the threaded fastener 74 forces the concentric sleeves 70 and 72 wedgingly toward one another, such that the inner sleeve 72 compresses about the shaft 14.

In the illustrated embodiment, the sleeve 70 includes an outer annular groove 76 bounded by an annular lip 78, which is adjacent a distal or end face 80 of the sleeve 70. In operation, the end face 80 serves as an abutment surface between the sleeve 70 and the threaded fastener 74, while the annular groove 76 and lip 78 are disposed in a mating lip 82 and groove 84 of the threaded fastener 74. The threaded fastener 74 also has internal threads 86, which are rotatably engageable with external threads 88 of the sleeve 72. Accordingly, the threaded fastener 74 threadingly moves along the sleeve 72, while forcing the sleeve 70 inwardly or outwardly from the sleeve 70. It should be noted that various additional features not specifically illustrated in the figures may be included within the sleeve 72. For example, slits extending partially are completely through the sleeve 72 may be provided to permit expansion or contraction of the sleeve 72 during tightening or loosening within the assembly. Similarly, such slits may accommodate keys, splines, or other mechanical features used to secure the various elements with respect to one another and to permit transmission of torque in application.

Figure 4:
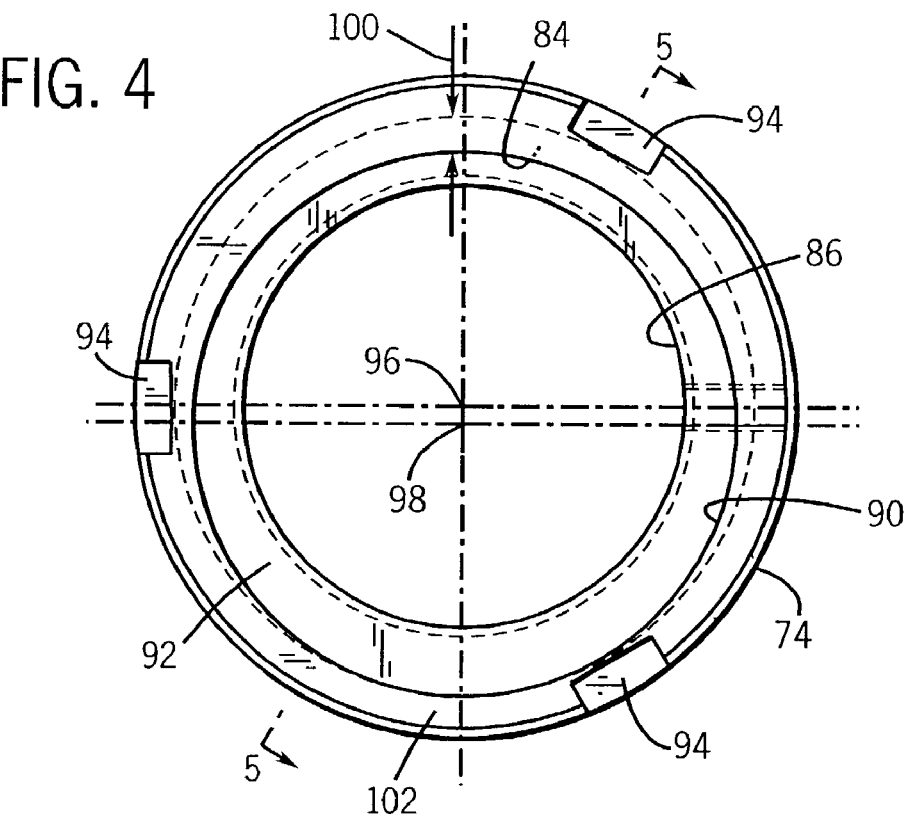
FIG. 4 is an elevational view of a locking member or nut as used in the system of FIG. 3, illustrating the eccentric aperture and varying depth groove used for mounting and operating the nut for engagement and disengagement of the system.
Figure 5:
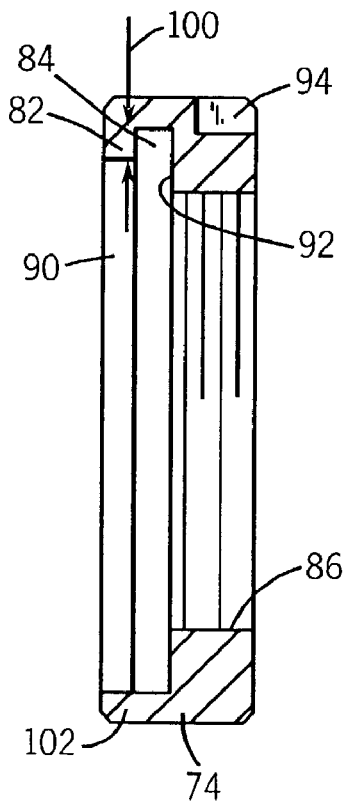
FIG. 5 is a side sectional view of the nut of FIG. 4, illustrating various surfaces and features of the nut.
Figure 6:
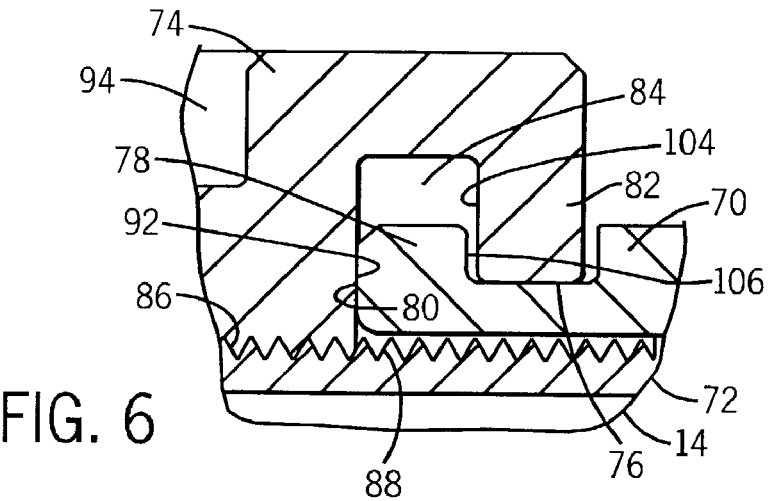
FIG. 6 is a detail view of interfacing surfaces of the nut and hollow member of FIG. 3.

As best illustrated in FIGS. 4, 5, and 6, the internal threads 86 of the threaded fastener 74 are designed for engagement on the external threads 88 of sleeve 72. An aperture 90 (see, e.g., FIGS. 4 and 5) is formed eccentrically on a front face of threaded fastener 74. The aperture 90 forms an opening larger than the diametrical dimension of lip 78 of sleeve 70, such that the threaded fastener 74 may be slipped onto the lip 78 during assembly. Inside the eccentric aperture 90, the lip 82 and groove 84 of the threaded fastener 74 have a varying depth attributed to the eccentricity of the aperture 90. Accordingly, the sleeve 72 may be inserted into the aperture 90 due to the varying depth of the lip 82 and groove 84, which can subsequently interlock with the respective groove 76 and lip 78 of the sleeve 72. The eccentric aperture 90 also has an abutment face 92 that bounds the groove 84 on a side opposite the lip 82. Finally, tool recesses 94 or similar structures are preferably provided to permit engagement of a tool (not shown) for tightening and loosening the threaded fastener 74 in the assembly.

Referring to FIGS. 4 and 5, the groove 84 and internal threads 86 of threaded fastener 74 have a common central axis 96, which is generally the rotational axis of threaded fastener 74. In contrast, the eccentric aperture 90 has an offset axis 98, which is displaced from axis 96 to form the lip 82 and groove 84 of varying depth. In the illustrated embodiment, the lip 82 and groove 84 have a depth that varies from a maximum depth 100 to a minimal depth 102 at a point diametrically opposed to depth 100. At the point of minimum depth 102, the groove 84 is substantially flush with eccentric aperture 90. Various other configurations can be provided in which the minimum depth does not vary down to the point at which the groove and aperture are flush with one another. As noted above, the illustrated configuration permits the threaded fastener 74 to be installed on the sleeve 70 and engaged on the external threads 88 of sleeve 72. In an assembly and mounting process, the threaded fastener 74 can be placed over the lip 78 and centered on the sleeve 70, because the eccentric aperture 90 is larger in dimension than the lip 78 of the sleeve 70 with the bearing assembly, shaft and tapered sleeve positioned loosely with respect to one another. The sleeve 70 is then drawn outwardly into engagement with the threaded fastener 74. Once engaged with the sleeve 70, the threaded fastener 74 is threaded onto the sleeve 72 to draw the concentric sleeves 70 and 72 into wedging engagement with one another until the sleeve 72 compresses or wedges onto the shaft 14.

Interaction of various surfaces of the threaded fastener 74 and concentric sleeves 70 and 72 are best illustrated in FIG. 6. In the illustrated embodiment, as threaded fastener 74 is rotated during assembly of the system, abutment face 92 of the threaded fastener 74 contacts the distal face 80 of the sleeve 70 to draw the concentric sleeves 70 and 72 into tight engagement with one another, thereby wedgingly compressing the sleeve 72 about the shaft 14 (see, e.g., FIG. 2). In an alternative embodiment, the lip formed on the threaded fastener can be engaged on a corresponding surface of the respective sleeve. However, in the present embodiment, full engagement of the distal face 80 of the sleeve 70 and the abutment face 92 of the threaded fastener 74 is preferred to force tight engagement of the concentric sleeves 70 and 72 about the shaft 14.

The compressive fit mechanism 24 also may be disassembled and dismounted from the shaft 14 via reverse rotation and separation of the threaded fastener 74 through the eccentric aperture 90. In the detailed view of FIG. 6, the outer surface 104 of the varying depth lip 82 formed on the threaded fastener 74 engages an inner surface 106 of lip 78 of the sleeve 70. Although the two surfaces do not engage fully over 360°, it has been found that excellent force distribution can be obtained to cause separation of the concentric sleeves 70 and 72 and release of the sleeve 72 from the shaft 14. Again, the threaded fastener 74 is maintained centered by engagement on the external threads 88 of the sleeve 72. Following the initial release of the concentric sleeves 70 and 72, the system can be fully disassembled by disengaging the threaded fastener 74 from the sleeve 72, by removing the concentric sleeves 70 and 72 from the shaft 14, and by separating the concentric sleeves 70 and 72.

Figure 7:
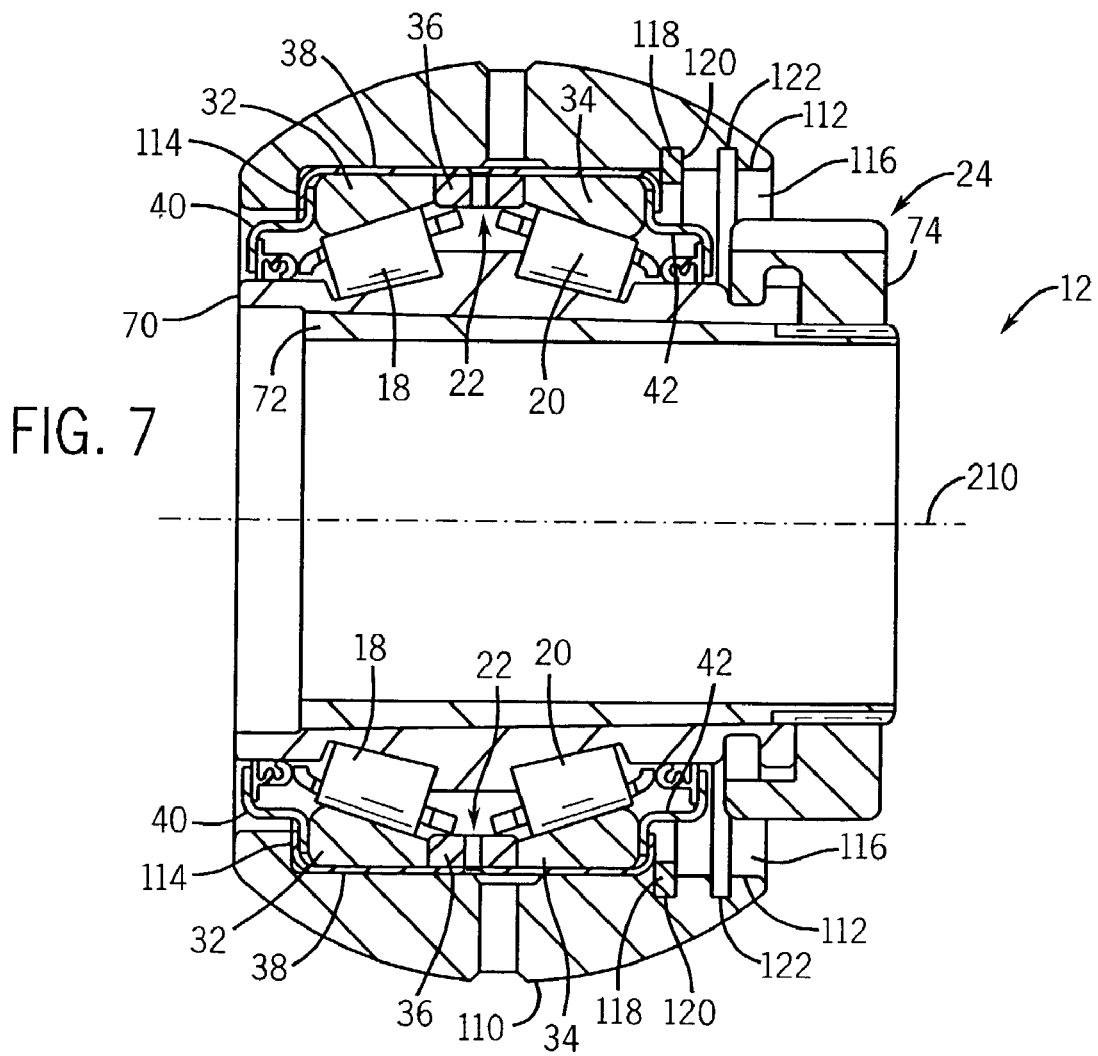
FIG. 7 is a partial sectional view of the bearing system of FIG. 3, illustrating the bearing assembly within a spherical housing.

As discussed above, the bearing assembly 12 may have a variety internal and external mounting mechanisms. The foregoing threaded fastener and compressive fit mechanisms 22 and 24 are exemplary mechanisms for internal mounting of the bearing assembly 12 about the shaft 14. However, as mentioned above, the bearing assembly 12 also may have an external mounting mechanism to accommodate system expansion, contraction, and misalignment. FIG. 7 illustrates an exemplary mountable outer casing 110, which is disposed about the bearing assembly 12 illustrated in FIG. 3. In this exemplary embodiment, the mountable outer casing 110 has an internal cavity 112 with a retaining end 114 and an open end 116, which allows insertion of the bearing assembly 12 into the mountable outer casing 110. Once inserted into the internal cavity 112, the bearing assembly 12 may be secured via retaining member 118 (e.g., a snap ring), which may be selectively disposed in one of a plurality of retainer grooves, such as grooves 120 and 122. Each of these retainer grooves provides a different longitudinal mounting depth, which may be suitable for a particular bearing assembly or a desired amount of longitudinal float within the mountable outer casing 110. Accordingly, the bearing assembly 12 is secured between the retaining end 114 and the retaining member 118, such that the bearing assembly 12 may be longitudinally fixed or movable depending on the retaining groove selected for the retaining member 118. In the illustrated configuration, opposite ends of the outer retaining sleeve 38 abut the retaining end 114 and the retaining member 118, such that the bearing assembly 12 is longitudinally fixed within the mountable outer casing 110. However, given the integral nature of the bearing assembly 12 and the clearance control and mount mechanism 16, the retaining member 118 may be disposed in the groove 122 to provide a range of longitudinal float. This float can accommodate a wide variety of system expansion and contraction in the longitudinal direction.

Figure 8:
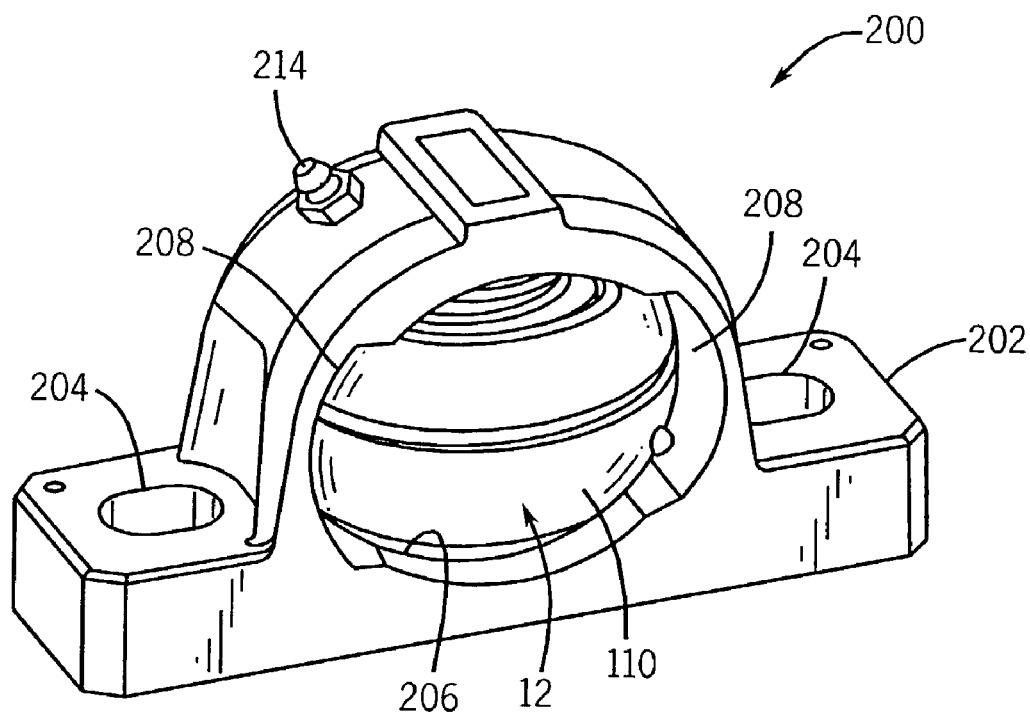
FIG. 8 is a perspective view of the bearing assembly of FIG. 7, illustrating the bearing assembly inserted into a bearing mount assembly via insertion slots.
Figure 9:
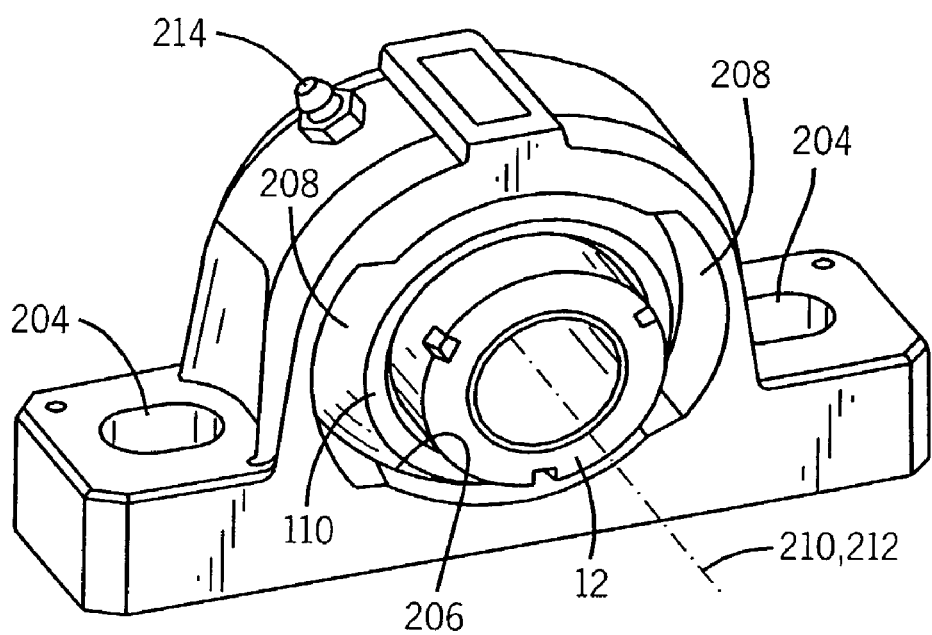
FIG. 9 is a perspective view of the bearing assembly of FIG. 8, illustrating the bearing assembly rotated to an operable position within the bearing mount assembly.
Figure 10:
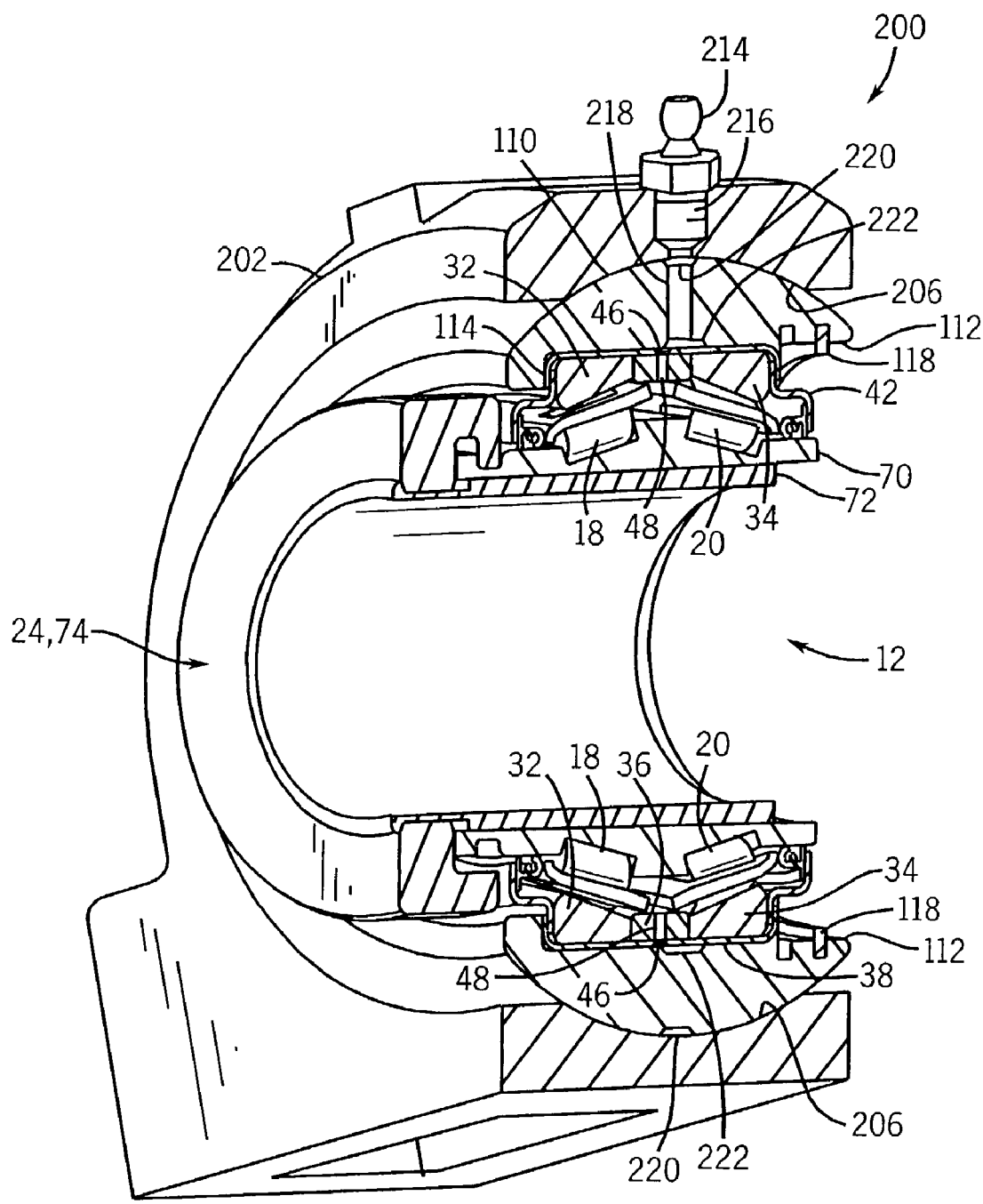
FIG. 10 is a partial sectional view of the bearing system of FIGS. 7–9, illustrating the engagement of the various components with respect to one another.

The mountable outer casing 110 also may have an external geometry, such as a cylindrical or spherical geometry, which is insertable into a mount structure for the bearing assembly 12. In the illustrated embodiment of FIG. 7, the mountable outer casing 110 has a spherical geometry, which is insertable into a spherical cavity to accommodate rotational movement, vibrations, misalignment, and other positional anomalies in the system. FIGS. 8–10 illustrate an exemplary bearing system 200 having the bearing assembly 12 inserted into a mount structure 202 via the mountable outer casing 110. The mount structure 202 may be a multi-piece or integral structure, such as the one-piece structure illustrated in FIGS. 8–10. The mount structure 202 also may have one or fastening mechanisms, such as fastener receptacles 204, to couple the mount structure 202 to a desired structure.

As illustrated in FIG. 8, the mount structure 202 also has a partially spherical mount chamber 206 with opposite mounting slots 208. The bearing assembly 12 is insertable into the spherical mount chamber 206 by aligning the mountable outer casing 110 with the opposite slots 208. It should be noted that the foregoing alignment and insertion may be performed without all or part of the compressive fit mechanism 24 (e.g., the threaded fastener 74). If already assembled, then all or part of the compressive fit mechanism 24 (e.g., the threaded fastener 74) may be removed to facilitate insertion of the bearing assembly 12 into the spherical mount chamber 206.

Once inserted into the spherical mount chamber 206, the bearing assembly 12 may be rotated approximately 90 degrees to align a longitudinal axis 210 of the bearing assembly 12 with a longitudinal axis 212 of the mount structure 202, as illustrated in FIG. 9. The rotation of the bearing assembly 12 also positions the mountable outer casing 110 in a blocked relationship within the spherical mount chamber 206. If previously unassembled or removed, the compressive fit mechanism 24 (e.g., the threaded fastener 74) may be assembled with the bearing assembly 12. It also should be noted that the protruding geometry of the compressive fit mechanism 24 (e.g., the threaded fastener 74) may further secure the bearing assembly 12 within the spherical mount chamber 206. For example, the threaded fastener 74 may extend beyond the diameter of the spherical mount chamber 206, thereby preventing realignment and removal of the mountable outer casing 110 through the opposite slots 208. The bearing assembly 12 is removed by reversing the foregoing procedure, such that the mountable outer casing 110 is aligned and removed through the opposite slots 208.

The bearing system 200 also has an integral lubrication system, which facilitates lubrication of the bearing assembly 12 at various stages of assembly and operation. As illustrated in FIG. 10, the mount structure 202 has a lubrication nipple 214 coupled to a lubrication passageway 216, which extends into the spherical mount chamber 206. At the inner surface of the spherical mount chamber 206, the lubrication passageway 216 may have one or more lubrication grooves extending circumferentially around the spherical mount chamber 206. The lubrication passageway 216 (and optional groove) is also alignable with a lubrication passageway 218, which extends through the mountable outer casing 120 and into the internal cavity 112. In the illustrated embodiment, the mountable outer casing 120 also has a circumferential outer groove 220 alignable with the lubrication passageway 216 to facilitate the distribution of a lubrication fluid between the spherical mount chamber 206 and the mountable outer casing 110 of the bearing assembly. At the inner surface of the internal cavity 112, the lubrication passageway 218 is alignable with the lubrication receptacles 46 and 48, which extend through the clearance control and support mechanism 16 to the tapered roller arrays 18 and 20. The illustrated casing 120 also has a circumferential inner groove 222, which ensures lubrication flow through the lubrication receptacles 46 and 48 regardless of the bearing assembly's longitudinal position within the mountable outer casing 110. For example, the circumferential inner groove 222 can be fluidly coupled with the lubrication receptacles 46 and 48 as the bearing assembly 12 floats longitudinally between the retaining end 114 and the retaining member 118.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A bearing assembly, comprising:
   an inner mounting sleeve mountable to a rotatable member;
   a plurality of rows of tapered roller members disposed adjacent one another circumferentially about the inner mounting sleeve;
   a plurality of tapered roller support rings disposed circumferentially about the respective rows of tapered roller members;
   a spacer having substantially flat sides disposed between two of the plurality of tapered roller support rings;
   an outer retaining sleeve disposed about the plurality of tapered roller support rings and the spacer; and
   a seal assembly extending between the inner mounting sleeve and the outer retaining sleeve around the plurality of rows of tapered roller members.

2. The bearing assembly of claim 1, wherein the inner mounting sleeve comprises a screw mount mechanism.

3. The bearing assembly of claim 1, wherein the inner mounting sleeve comprises a compressive fit mount mechanism.

4. The bearing assembly of claim 3, wherein the compressive fit mount mechanism comprises:
   first and second cylindrical sleeves, at least one having a tapered structure; and
   a locking member having a catch section and a threaded section engageable with the first and second cylindrical sleeves, respectively.

5. The bearing assembly of claim 1, wherein the spacer is configured to provide a desired endplay for at least two of the plurality of rows of tapered roller members.

6. The bearing assembly of claim 1, wherein the plurality of tapered roller support rings have a desired clearance set by the outer retaining sleeve and the spacer.

7. The bearing assembly of claim 1, wherein the outer retaining sleeve comprises a lubrication receptacle.

8. A rotatable system, comprising:
a rotatable member; and
an integral bearing assembly, comprising:
  an inner mounting sleeve coupled to the rotatable member;
  multiple rows of tapered cylindrical rollers disposed adjacent one another circumferentially about the inner mounting sleeve;
  a tapered roller support assembly disposed circumferentially about the multiple rows of tapered cylindrical rollers;
  a single clearance ring disposed adjacent the tapered roller support assembly, wherein the single clearance ring is substantially flat and substantially non-resilient;
  an outer retaining sleeve disposed about the tapered roller support assembly and the single clearance ring; and
  an integral seal assembly extending between the inner mounting sleeve and the outer mounting sleeve.

9. The rotatable system of claim 8, wherein the multiple rows of tapered cylindrical rollers have a desired clearance set by the single clearance ring and the outer retaining sleeve, which jointly secure the tapered roller support assembly in a desired holding position.

10. The rotatable system of claim 8, comprising a mount structure disposed about the integral bearing assembly.

11. The rotatable system of claim 10, wherein the mount structure comprises a retainer assembly disposed in a blocking position adjacent each end of the outer retaining sleeve.

12. The rotatable system of claim 11, wherein the retainer assembly comprises a pair of retainers spaced apart at a distance greater than the width of the outer retaining sleeve.

13. The rotatable system of claim 8, wherein the inner mounting sleeve comprises a screw mount mechanism.

14. The rotatable system of claim 8, wherein the inner mounting sleeve comprises an adapter mount mechanism.

15. The rotatable system of claim 14, wherein the adapter mount mechanism comprises:
  first and second cylindrical sleeves, at least one having a tapered structure; and
  a locking member having a catch section and a threaded section engageable with the first and second cylindrical sleeves, respectively.

16. The rotatable system of claim 8, wherein the single clearance ring has a width selected to provide a desired endplay for the multiple rows of tapered cylindrical rollers.

17. The rotatable system of claim 16, wherein the tapered roller support assembly has a desired roller clearance secured by the single clearance ring and the outer retaining sleeve.

18. The rotatable system of claim 8, wherein the outer retaining sleeve comprises a lubrication receptacle.

19. A method for making a bearing assembly, comprising the acts of:
  positioning a plurality of adjacent rows of tapered roller members circumferentially about an inner sleeve that is mountable to a rotatable member;
  externally supporting the plurality of adjacent rows of tapered roller members with a plurality of tapered roller support rings;
  non-resiliently spacing the plurality of tapered roller support rings with a roller clearance mechanism to provide a desired clearance about the plurality of adjacent rows of tapered roller members;
  retaining the plurality of tapered roller support rings and the roller clearance mechanism about the plurality of adjacent rows of tapered roller members via an outer sleeve; and
  sealing the bearing assembly by extending a seal between the inner sleeve and the outer sleeve around the plurality of adjacent rows of tapered roller members.

20. The method of claim 19, comprising the act of selecting the roller clearance mechanism with dimensions to set the desired clearance.

21. The method of claim 19, comprising the act of forming a screw mount mechanism on the inner sleeve.

22. The method of claim 19, comprising the act of forming an adapter mount mechanism on the inner sleeve.

23. The method of claim 22, wherein the act of forming the adapter mount mechanism comprises the act of assembling concentric cylindrical sleeves, at least one of which has a tapered structure.

24. The method of claim 23, wherein the act of forming the adapter mount mechanism comprises the act of intercoupling the concentric cylindrical sleeves with a locking member having a catch section and a threaded section engageable with first and second sleeves of the concentric cylindrical sleeves, respectively.

25. The method of claim 19, comprising the act of forming a lubrication receptacle extending through the outer sleeve to the plurality of adjacent rows of tapered roller members.

26. The method of claim 19, comprising the act of lubricating the bearing assembly via a lubrication receptacle extending through the outer sleeve.

27. The method of claim 19, wherein the act of spacing comprises the act of wedging the tapered roller support rings against the plurality of adjacent rows of tapered roller members.

28. The method of claim 19, comprising the act of inserting the outer sleeve in a bearing mount structure.

29. The method of claim 28, wherein the act of inserting comprises the act of securing the outer sleeve in a fixed position within the bearing mount structure.

30. The method of claim 28, wherein the act of inserting comprises the act of movably securing the outer sleeve in the bearing mount structure within a desired range of float.

31. A method of operating a rotational system, comprising the acts of:
  operating the rotational system;
  rotating an integral bearing assembly having multiple circumferential rows of tapered rollers disposed between inner and outer sleeves with a desired rolling clearance set by a clearance control mechanism; and
  longitudinally moving the integral bearing assembly in a mounting chamber disposed about the outer sleeve in response to a geometrical variation in the rotational system.

32. The method of claim 31, wherein the act of operating the rotational system comprises the act of turning the rotational system with a motor.

33. The method of claim 31, wherein the act of rotating the integral bearing assembly comprises turning a rotatable member extending at least partially through the integral bearing assembly.

34. The method of claim 31, wherein the act of longitudinally moving the integral bearing assembly comprises the act of accommodating the geometrical variation associated with thermal expansion.

35. The method of claim 31, wherein the act of longitudinally moving the integral bearing assembly comprises the act of reducing component wear in the rotational system.

36. The method of claim 31, wherein the clearance control mechanism is substantially non-resilient.

37. A rotatable system, comprising:
a rotatable member;
an integral bearing assembly, comprising:
an inner mounting sleeve coupled to the rotatable member;
multiple rows of tapered cylindrical rollers disposed adjacent one another circumferentially about the inner mounting sleeve;
a tapered roller support assembly disposed circumferentially about the multiple rows of tapered cylindrical rollers;
a single clearance ring disposed adjacent the tapered roller support assembly, wherein the single clearance ring is substantially flat and substantially non-resilient;
an outer retaining sleeve disposed about the tapered roller support assembly and the single clearance ring; and
a mount structure disposed about the integral bearing assembly, wherein the mount structure comprises a retaining assembly disposed in a blocking position adjacent each end of the outer retaining sleeve.

38. A method for making a bearing assembly, comprising the acts of:
positioning a plurality of adjacent rows of tapered roller members circumferentially about an inner sleeve that is mountable to a rotatable member;
externally supporting the plurality of adjacent rows of tapered roller members with a plurality of tapered roller support rings;
non-resiliently spacing the plurality of tapered roller support rings with a roller clearance mechanism to provide a desired clearance about the plurality of adjacent rows of tapered roller members;
retaining the plurality of tapered roller support rings and the roller clearance mechanism about the plurality of adjacent rows of tapered roller members via an outer sleeve; and
forming an adapter mount mechanism on the inner sleeve, wherein the act of forming an adapter mount mechanism comprises the acts of:
assembling concentric cylindrical sleeves, at least one of which has a tapered structure; and
intercoupling the concentric cylindrical sleeves with a locking member having a catch section and a threaded section engageable with first and second sleeves of the concentric cylindrical sleeves, respectively.

39. A method for making a bearing assembly, comprising the acts of:
positioning a plurality of adjacent rows of tapered roller members circumferentially about an inner sleeve that is mountable to a rotatable member;
externally supporting the plurality of adjacent rows of tapered roller members with a plurality of tapered roller support rings;
non-resiliently spacing the plurality of tapered roller support rings with a roller clearance mechanism to provide a desired clearance about the plurality of adjacent rows of tapered roller members;
retaining the plurality of tapered roller support rings and the roller clearance mechanism about the plurality of adjacent rows of tapered roller members via an outer sleeve; and
inserting the outer sleeve in a bearing mount structure; wherein the act of inserting comprises the acts of:
securing the outer sleeve in a fixed position within the bearing mount structure; and
movably securing the outer sleeve in the bearing mount structure within a desired range of float.

* * * * *